US009818147B2

(12) United States Patent
Tapley et al.

(10) Patent No.: US 9,818,147 B2
(45) Date of Patent: Nov. 14, 2017

(54) 3D PRINTING: MARKETPLACE WITH FEDERATED ACCESS TO PRINTERS

(71) Applicant: eBay Inc., San Jose, CA (US)

(72) Inventors: John Tapley, San Jose, CA (US); Scott Leach, Pleasanton, CA (US); Nathalie Walton, San Francisco, CA (US); Shakul Hameed Kajamohideen, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/956,550

(22) Filed: Dec. 2, 2015

(65) Prior Publication Data

US 2016/0086254 A1    Mar. 24, 2016

Related U.S. Application Data

(63) Continuation of application No. 14/170,054, filed on Jan. 31, 2014, now Pat. No. 9,229,674.

(51) Int. Cl.
*G06Q 30/06* (2012.01)
*G06F 3/12* (2006.01)
(Continued)

(52) U.S. Cl.
CPC ..... *G06Q 30/0635* (2013.01); *B29C 67/0088* (2013.01); *B33Y 40/00* (2014.12);
(Continued)

(58) Field of Classification Search
CPC ...... G06F 21/10; G06F 3/1238; G06F 3/1222; G06F 3/1219; G06F 2221/0797;
(Continued)

(56) References Cited

U.S. PATENT DOCUMENTS 7,044,395 B1    5/2006 Davis et al.
8,286,236 B2    10/2012 Jung et al.
(Continued)

FOREIGN PATENT DOCUMENTS

CN    101595510 A    12/2009
CN    103950198 A    7/2014
(Continued)

OTHER PUBLICATIONS

"3D Printing Materials on Shapeways: Material Portfolio", [Online]. Retrieved from the Internet: <URL: http://www.shapeways.com/materials>, (Accessed Feb. 18, 2014), 2 pgs.
(Continued)

*Primary Examiner* — Iriana Cruz
(74) *Attorney, Agent, or Firm* — Schwegman Lundberg & Woessner, P.A.

(57) ABSTRACT

Systems, methods, and media for optimizing and facilitating 3D printing services in a marketplace environment are provided. In one example, a system comprises a memory and at least one module, executing on one or more computer processors, to host or participate in a 3D printing service marketplace environment including marketplace participants and a federated network of 3D printing service providers. The at least one module receives a 3D printing request from a marketplace participant to print a 3D object at a 3D printing service provider, and communicates with at least some of the federated network of 3D printer service providers within the marketplace environment. In response to the received request, the at least one module lists at least some of the 3D printing service providers based on a 3D printer identifier metric. The 3D printer identifier metric may include a digital rights authorization.

11 Claims, 8 Drawing Sheets

(51) Int. Cl.

| | |
|---|---|
| *G06F 21/10* | (2013.01) |
| *B29C 67/00* | (2017.01) |
| *B33Y 40/00* | (2015.01) |
| *G06Q 30/00* | (2012.01) |
| G06Q 50/04 | (2012.01) |
| B29K 75/00 | (2006.01) |
| *B33Y 10/00* | (2015.01) |
| *B33Y 30/00* | (2015.01) |

(52) U.S. Cl.
CPC .............. *G06F 3/122* (2013.01); *G06F 3/126* (2013.01); *G06F 3/1211* (2013.01); *G06F 3/1219* (2013.01); *G06F 3/1222* (2013.01); *G06F 3/1238* (2013.01); *G06F 3/1288* (2013.01); *G06F 3/1296* (2013.01); *G06F 21/10* (2013.01); *G06Q 30/00* (2013.01); *B29K 2075/00* (2013.01); *B33Y 10/00* (2014.12); *B33Y 30/00* (2014.12); *G06F 2221/0797* (2013.01); *G06Q 50/04* (2013.01); *Y02P 90/30* (2015.11)

(58) Field of Classification Search
CPC ...... G06F 3/1296; G06F 3/1211; G06F 3/122; G06F 3/126; G06F 3/1288; G06Q 50/04; G06Q 30/00; G06Q 30/0635; B29K 2075/00; B33Y 10/00; B33Y 30/00; B33Y 40/00; Y02P 90/30; B29C 67/0088
See application file for complete search history.

(56) References Cited

U.S. PATENT DOCUMENTS

| | | |
|---|---|---|
| 8,412,588 B1 | 4/2013 | Bodell et al. |
| 9,177,371 B2 | 11/2015 | Metala et al. |
| 9,229,674 B2 | 1/2016 | Tapley |
| 9,361,553 B1 | 6/2016 | Ito |
| 9,595,037 B2 | 3/2017 | Glasgow |
| 2002/0080139 A1 | 6/2002 | Koo et al. |
| 2003/0040971 A1 | 2/2003 | Freedenberg et al. |
| 2003/0182475 A1 | 9/2003 | Gimenez et al. |
| 2007/0217672 A1 | 9/2007 | Shannon et al. |
| 2007/0226488 A1 | 9/2007 | Lin et al. |
| 2007/0255580 A1* | 11/2007 | Cole ....................... G06F 21/10 705/1.1 |
| 2008/0040059 A1 | 2/2008 | Ersue et al. |
| 2008/0247636 A1 | 10/2008 | Davis et al. |
| 2009/0248632 A1 | 10/2009 | Subramanian |
| 2009/0279784 A1 | 11/2009 | Arcas |
| 2009/0303507 A1 | 12/2009 | Abeloe |
| 2009/0303607 A1 | 12/2009 | Inoue et al. |
| 2010/0088650 A1 | 4/2010 | Kaltenbach et al. |
| 2011/0087350 A1 | 4/2011 | Fogel et al. |
| 2011/0234581 A1 | 9/2011 | Eikelis et al. |
| 2011/0254840 A1 | 10/2011 | Halstead |
| 2011/0298901 A1 | 12/2011 | Derrien et al. |
| 2012/0056984 A1 | 3/2012 | Zhang et al. |
| 2012/0092724 A1 | 4/2012 | Pettis |
| 2012/0229619 A1 | 9/2012 | Shirkhodaie et al. |
| 2012/0259738 A1 | 10/2012 | Pillai |
| 2013/0114904 A1 | 5/2013 | Chang et al. |
| 2013/0120369 A1 | 5/2013 | Miller et al. |
| 2013/0193621 A1 | 8/2013 | Daya et al. |
| 2013/0207965 A1 | 8/2013 | Hori et al. |
| 2013/0219463 A1 | 8/2013 | Sambamurthy et al. |
| 2013/0262231 A1 | 10/2013 | Glasgow et al. |
| 2014/0042670 A1 | 2/2014 | Pettis et al. |
| 2014/0095133 A1 | 4/2014 | Silva et al. |
| 2014/0156053 A1* | 6/2014 | Mahdavi ............. B29C 67/0059 700/119 |
| 2014/0182170 A1 | 7/2014 | Wawrousek et al. |
| 2014/0214684 A1 | 7/2014 | Pell |
| 2014/0221125 A1 | 8/2014 | Day |
| 2014/0279706 A1 | 9/2014 | Blasko |
| 2014/0286536 A1 | 9/2014 | Pettersson et al. |
| 2014/0316546 A1 | 10/2014 | Walsh et al. |
| 2015/0052025 A1* | 2/2015 | Apsley ............... G06Q 30/0635 705/26.81 |
| 2015/0091905 A1 | 4/2015 | Wang et al. |
| 2015/0165692 A1 | 6/2015 | Morrow et al. |
| 2015/0169261 A1* | 6/2015 | Giannetti .............. G06F 3/1204 358/1.15 |
| 2015/0189355 A1 | 7/2015 | Korbecki |
| 2015/0220291 A1 | 8/2015 | Tapley et al. |
| 2015/0220748 A1 | 8/2015 | Leach et al. |
| 2015/0221053 A1 | 8/2015 | Tapley et al. |
| 2016/0019270 A1 | 1/2016 | Jones et al. |
| 2016/0167307 A1 | 6/2016 | Eramian et al. |
| 2016/0167308 A1 | 6/2016 | Glasgow et al. |
| 2016/0171354 A1 | 6/2016 | Glasgow et al. |

FOREIGN PATENT DOCUMENTS

| | | |
|---|---|---|
| WO | WO-2012146943 A2 | 11/2012 |
| WO | WO-2013036942 A1 | 3/2013 |
| WO | WO-2013049889 A1 | 4/2013 |
| WO | WO-2013126221 A1 | 8/2013 |
| WO | WO 2013149296 A1 | 10/2013 |
| WO | WO-2015116336 A1 | 8/2015 |
| WO | WO-2015116341 A1 | 8/2015 |
| WO | WO-2016100126 A1 | 6/2016 |

OTHER PUBLICATIONS

"3D Printing Price Check", Society for Printable Geography, [Online]. Retrieved from the Internet: <URL: http://3dprintingpricecheck.com/>, (Accessed Feb. 17, 2014), 3 pgs.

"3D Printing Sculpteo Design Maker on the App Store on iTunes", [Online]. Retrieved from the Internet: <URL: https://itunes.apple.com/us/app/3d-printing-sculpteo-design/id484590663>, (Accessed Feb. 17, 2014), 2 pgs.

"3d Printing Service Bureau—TexasPanaShape.com", [Online]. Retrieved from the Internet: <URL: http://panashape.com/index.php/3d-printing-service-bureau, (Accessed Feb. 17, 2014), 2 pgs.

"3D Printing Service i.materialise", [Online]. Retrieved from the Internet: <URL: http://i.materialise.com/>, (Accessed Feb. 17, 2014), 3 pgs.

"3D Printing Services in Your Neighborhood: makexyz.com", [Online]. Retrieved from the Internet: <URL: http://www.makexyz.com/>, (Accessed Feb. 17, 2014), 1 pg.

"U.S. Appl. No. 10/252,129, Response filed Jul. 10, 2015 to Non Final Office Action dated Apr. 22, 2015", 21 pgs.

"U.S. Appl. No. 14/170,054 Response Filed Jul. 10, 2015 to Final Office Action dated Apr. 21, 2015", 11 pgs.

"U.S. Appl. No. 14/170,054, Final Office Action dated Apr. 21, 2015", 13 pgs.

"U.S. Appl. No. 14/170,054, Non Final Office Action dated Oct. 1, 2014", 9 pgs.

"U.S. Appl. No. 14/170,054, Notice of Allowance dated Aug. 25, 2015", 9 pgs.

"U.S. Appl. No. 14/170,054, Response filed Dec. 23, 2014 to Non Final Office Action dated Oct. 1, 2014", 10 pgs.

"U.S. Appl. No. 14/170,054, Supplemental Notice of Allowability dated Sep. 10, 2015", 2 pgs.

"U.S. Appl. No. 14/571,629, Non Final Office Action dated Jan. 21, 2016", 19 pgs.

"U.S. Appl. No. 14/571,629, Response filed Oct. 21, 2015 to Restriction Requirement dated Oct. 16, 2015", 6 pgs.

"U.S. Appl. No. 14/571,629, Restriction Requirement dated Oct. 16, 2015", 6 pgs.

"International Application Serial No. PCT/US2014/072259, International Search Report dated Apr. 22, 2015", 2 pgs.

"International Application Serial No. PCT/US2014/072259, Written Opinion dated Apr. 22, 2015", 5 pgs.

"International Application Serial No. PCT/US2014/072723, International Search Report dated Apr. 29, 2015", 2 pgs.

"International Application Serial No. PCT/US2014/072723, Written Opinion dated Apr. 29, 2015", 5 pgs.

(56) References Cited

OTHER PUBLICATIONS

"Kraftwurx.com", Kraftwurx Inc., [Online]. Retrieved from the Internet: <URL: http://www.kraftwurx.com/>, (Accessed Feb. 18, 2014), 14 pgs.
"Kraftwurx: CrunchBase Profile", [Online]. Retrieved from the Internet: <URL: http://www.crunchbase.com/company/kraftwurx>, (Accessed Feb. 17, 2014), 2 pgs.
"Laser Cutting and Engraving—Design, Make & Build Your Own Products with Ponko", [Online]. Retrieved from the Internet: <URL: https://www.ponoko.com/>, (Accessed Feb. 17, 2014), 2 pgs.
"makexyz: CrunchBase Profile", [Online]. Retrieved from the Internet: <URL: http://www.crunchbase.com/company/makexyz>, (Accessed Feb. 17, 2014), 1 pg.
"Ponoko: CrunchBase Profile", [Online]. Retrieved from the Internet: <URL: http://www.crunchbase.com/company/ponoko>, (Accessed Feb. 17, 2014), 3 pgs.
"Print 3D Models: Kraftwurx", [Online]. Retrieved from the Internet: <URL: http://www.kraftwurx.com/print-3d-models> (Link no longer working as of Feb. 18, 2014.), (Accessed Feb. 18, 2014), 1 pg.
"Prototyping Automobile Dashboards: Stratasys", [Online]. Retrieved from the Internet: <URL: http://www.stratasys.com/resources/case-studies/automotive/hyundai-mobis>, (Accessed Feb. 17, 2014), 2 pgs.
"Sculpteo: CrunchBase Profile", [Online]. Retrieved from the Internet: <URL: http://www.crunchbase.com/company/sculpteo>, (Accessed Feb. 17, 2014), 2 pgs.
"Sculpteo: Your 3D Design Turns into Reality with 3D Printing", [Online]. Retrieved from the Internet: <URL: http://www.sculpteo.com/en/>, (Accessed Feb. 17, 2014), 3 pgs.
"Shapeways: CrunchBase Profile", [Online]. Retrieved from the Internet: <URL: http://www.crunchbase.com/company/shapeways>, (Accessed Feb. 17, 2014), 2 pgs.
"Shapeways: make, Buy, and Sell Custom Products with 3D Printing", [Online]. Retrieved from the Internet: <URL: http://www.shapeways.com/>, (Accessed Feb. 17, 2014), 3 pgs.
De Zwart, Bram, et al., "3D Hubs: Local 3D Printing Services and 3D Printers", [Online]. Retrieved from the Internet: <URL: http://www.3dhubs.com/>, (Accessed Feb. 17, 2014), 6 pgs.
Osborne, Charlie, "Could a New Patent Prevent a 3D Printing Free-for-All?—SmartPlanet", CBS Interactive, [Online]. Retrieved from the Internet: <URL: http://www.smartplanet.com/blog/bulletin/could-a-new-patent-prevent--3d-printi . . . >, (Oct. 15, 2012), 4 pgs.
Osborne, Charlie, "The 3D Printer That FIts into a Suitcase", CBS Interactive, [Online]. Retrieved from the Internet: <URL: http://www.smartplanet.com/blog/smart-takes/the-3d-printer-that-fits-into-a suitca . . . >, (Aug. 5, 2012), 3 pgs.
Suttell, Scott, "Public Libraries Find 3-D Printers ar a Big Draw—Cleveland Business News", [Online]. Retrieved from the Internet: <URL: http://www.crainscleveland.com/article/20130801/BLOGS03/130809975>, (Aug. 1, 2013), 4 pgs.
Wolf, Michael, "3D Printing with Paper at Your Local Office Supply Store? Yep, If Mcor Has Its Way", [Online]. Retrieved from the Internet: <URL: http://www.forbes.com/sites/michaelwolf/2013/03/13/3d-printing-with-paper-at-y . . . >, (Mar. 13, 2013), 4 pgs.
U.S. Appl. No. 14/170,006, filed Jan. 31, 2014, 3D Printing: Managing Digital Rights and Fulfilment in Online Marketplace Environments.
U.S. Appl. No. 14/170,122, filed Jan. 31, 2014, 3D Printing in Marketplace Environments.
U.S. Appl. No. 14/572,624, filed Dec. 16, 2014, Systems and Methods for Prototype Refrinement and Manufacture in 3D Printing.
U.S. Appl. No. 14/571,721, filed Dec. 16, 2014, Systems and Methods for 3D Digital Printing.
U.S. Appl. No. 14/571,629, filed Dec. 16, 2014, Digital Rights and Integrity Management in Three-Dimensional (3D) Printing.
"U.S. Appl. No. 14/571,629, Final Office Action dated Jun. 28, 2016", 9 pgs.
"U.S. Appl. No. 14/571,721, Non Final Office Action dated Jun. 22, 2016", 21 pgs.
Fisher, et al., "Context-Based Search for 3D Models", ACM Transactions on Graphics (TOG)—Proceedings of ACM SIGGRAPH Asia, (2010), 10 pgs.
Funkhouser, et al., "A Search Engine for 3D Models", ACM Transactions on Graphics, (2002), 28 pgs.
"U.S. Appl. No. 14/571,629, Response to Non Final Office Action dated Jan. 21, 2016", 14 pgs.
"International Application Serial No. PCT/US2015/065293, International Search Report dated Feb. 26, 2016", 2 pgs.
"International Application Serial No. PCT/US2015/065293, Written Opinion dated Feb. 26, 2016", 7 pgs.
"U.S. Appl. No. 14/571,629, Advisory Action dated Sep. 16, 2016", 5 pgs.
"U.S. Appl. No. 14/571,629, Preliminary Amendment filed Dec. 16, 2015", 5 pgs.
"U.S. Appl. No. 14/571,629, Response filed Sep. 28, 2016 to Advisory Actiion dated Sep. 16, 2016", 17 pgs.
"U.S. Appl. No. 14/571,679, Response filed Aug. 29, 2016 to Final Office Action dated Jun. 28, 2016", 13 pgs.
"U.S. Appl. No. 14/571,721, Response filed Sep. 20, 2016 to Non Final Office Action dated Jun. 22, 2016", 15 pgs.
"International Application Serial No. PCT/US2014/072259, International Preliminary Report on Patentability dated Aug. 11, 2016", 7 pgs.
"International Application Serial No. PCT/US2014/072723, International Preliminary Report on Patentability dated Aug. 11, 2016", 7 pgs.
"U.S. Appl. No. 14/571,629, Notice of Allowance dated Oct. 28, 2016", 12 pgs.
"U.S. Appl. No. 14/170,006, Non Final Office Action dated Jan. 13, 2017", 11 pgs.
"U.S. Appl. No. 14/170,122, Non Final Office Action dated Jan. 13, 2017", 10 pgs.
"U.S. Appl. No. 14/571,721, Final Office Action dated Jan. 12, 2017", 26 pgs.
"U.S. Appl. No. 14/572,624, First Action Interview—Pre-Interview Communication dated Feb. 7, 2017", 4 pgs.
"Three Dimensional Visual Repair and Search of Damaged Machine Parts", IP.com, (Apr. 4, 2012), 3 pgs.
"U.S. Appl. No. 14/571,721, Non Final Office Action dated Apr. 10, 2017", 27 pgs.
"U.S. Appl. No. 14/571,721, Response filed Mar. 24, 2017 to Final Office Actio dated Jan. 12, 2017", 8 pgs.
"U.S. Appl. No. 14/572,624, First Action Interview—Office Action Summary dated Mar. 17, 2017", 6 pgs.
"U.S. Appl. No. 14/572,624, Response filed Mar. 8, 2017 to First Action Interview—Pre-Interview Communication dated Feb. 7, 2017", 7 pgs.
"Australian Application Serial No. 2014380128, First Examiner Report dated Feb. 9, 2017", 3 pgs.

\* cited by examiner

3D PRINTING: MARKETPLACE WITH FEDERATED ACCESS TO PRINTERS

REFERENCE TO RELATED APPLICATION

This Application is a continuation of U.S. application Ser. No. 14/170,054, filed Jan. 31, 2014, which is hereby incorporated by reference in its entirety.

TECHNICAL FIELD

The present application relates generally to the technical field of three-dimensional (3D) printing and, in particular, to printing service fulfilment in online marketplace environments. In various embodiments, systems, methods, and media are provided for facilitating the use of 3D printing services.

BACKGROUND

Additive manufacturing or 3D printing is a process of making a 3D solid object of virtually any shape from a digital model. 3D printing is achieved using an additive process, where successive layers of material are laid down in different shapes. 3D printing is considered distinct from traditional machining techniques, which mostly rely on the removal of material by methods such as cutting or drilling (subtractive processes).

The 3D printing technology is used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields.

There is a growing need for 3D printing services, which brings associated challenges of optimizing 3D printing resources and prioritizing 3D printing tasks.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
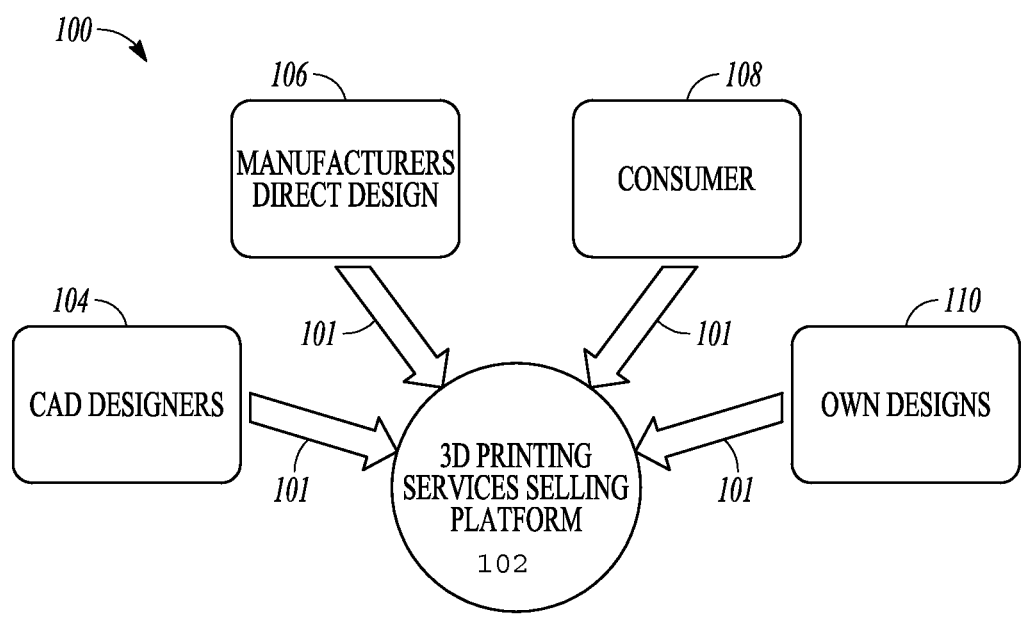
FIG. 1 is a schematic diagram depicting the upload of 3D designs and specifications to a 3D printing service selling platform, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail. In this specification, the terms "user" and "participant" are used interchangeably unless the context indicates otherwise.

In some embodiments, a 3D printing marketplace is created in which 3D printing service providers compete to fulfil requests for 3D printing tasks. In some examples, a 3D printing marketplace allows marketplace participants such as CAD designers, manufacturers, engineers, consumers, and so forth to upload designs or specifications (generally referred to herein as "digital models") into a marketplace platform (for example, hosted by an online retailer or a 3D service provider). In some examples, an upload fee is charged, for example, based on a fixed price or a variable price based on file size. In some examples, the uploaded designs are displayed to 3D service providers or users (buyers) participating in the marketplace. The display can occur through various communication mediums such as web-enabled devices, mobile applications, and the like. In some examples, buyers can select a 3D printing service to print a 3D version of the displayed design. In some examples, 3D service providers can compete or bid to complete a 3D printing task based on the displayed design. The buyers or 3D service providers can select a printing option associated with the displayed design from an array of available 3D printing options. In some examples, the 3D printing marketplace may have access to a system of federated 3D printing services or a network of such services. The federated or networked printing services may be ranked and displayed in order of preference or other identified criteria to a buyer.

In one example, a buyer can seek authorization from a digital rights owner or content provider in order to complete submission of, or a request for, a digital model for 3D printing. As used herein, the term digital rights refers to the human or other rights that allow individuals or entities to access, use, create, reproduce and publish digital media or to access and use computers, other electronic devices, or communications networks. The term is particularly related to the protection and realization of existing rights, such as copyright or other designs rights vesting in a three dimensional article, and includes rights in or to a digital model of that three dimensional article or adaptations of it. An owner of digital rights may for example be an original proprietor of such rights, an author, a designer, or a licensees or transferee of such rights. The term "digital rights" is not intended to be limiting, and the reference to an owner of digital rights in a 3D object is intended to include any entity having rights to create, use or reproduce that 3D object. An owner may authorize others to use the digital rights vesting in a 3D object or a digital model of the object.

In some examples, unless authorized, a buyer is restricted from using any 3D printing services to 3D print the digital model. In some cases, a buyer may be limited in the number of 3D models authorized for replication by 3D printing. In some examples, a digital rights owner may pre-authorize replication of a digital model for 3D printing in exchange for payment by the buyer of a royalty or other fee. The pre-authorization to print a specified digital model may be published to the 3D printing marketplace at large. The pre-authorization can be represented or embodied in the marketplace in various forms as discussed further below. A payment for royalty fees may be collected by a participant in the 3D marketplace, such as a 3D printing service provider, a retail merchant (for example, a toy store or Disney™ channel outlet), or an electronic storefront, for example. In some examples, a royalty payment or authentication fee is included in a service charge for 3D printing services.

In some examples, buyers can select an available 3D printing option or customize a design or digital model for 3D printing and, in some examples, may have multiple choices in buying the design or model, rights to the design or model, or 3D printing the design or model. In some examples, printing options for a buyer can include downloading a design file (or digital model) for their own use; requesting printing services limited to 3D variants only; and requesting shipment of a 3D printed object to a buyer address, in which event, for example, a 3D printing service could print and ship the 3D object from its own facility. The printing options could include requesting expedited shipment of a 3D printed object to a buyer address the same day (for example, using a "print now" facility), or requesting collection of a 3D printed object from a nearby 3D printing kiosk or mobile facility such as a 3D printing van, for example. In some examples, the 3D kiosk or mobile facility may form part of the federated or networked system of 3D printing services discussed further above.

Referring now to FIG. 1 of the accompanying drawings, participants in an online or electronic 3D printing marketplace environment generally designated 100, can, at operation 101, submit or upload designs or specifications (digital models) for 3D printing into a marketplace selling platform, such as a 3D printing services selling platform 102. The marketplace participants can include, for example, CAD designers 104, manufacturers 106 (for example, having direct or original designs), consumers (such as private persons, or corporate entities) 108, and entities 110 creating or owning proprietary 3D designs or digital models. The entities 110 can include retailers, merchants, branded entities, TV channels, or other electronic storefronts, for example. Other examples of marketplace participants are possible. In some examples, the participants own rights to the digital models submitted to the marketplace selling platform 102 and the printed 3D objects based on such models.

In some examples, an on-line 3D printing service (or online retailer, for example) presents an interface in the marketplace which displays various 3D printing service options, including different ways of selecting and purchasing these services. In some examples, an interface includes a portal allowing a user (buyer) to obtain access to or pay for authorization to 3D print a digital model from a digital rights owner. In some examples, a portal is provided allowing the owner of rights in a digital model to register those rights, or authenticate or grant permission for 3D printing of the model. In some examples, a digital rights owner can prevent 3D printing of a digital model or restrict the number of copies made. A monitoring or gate-keeper function for the 3D printing of digital models can be enabled by the printing service or marketplace host, for example.

In some examples, a consumer 108 (or other market participant) has direct or indirect access to a federated network of 3D printing services and printers and can provide or seek an availability of 3D printing resources, customize or select certain 3D printing tasks, and provide or seek a ranking of 3D printing resources. The ranking may be based on a suitability of a 3D printing resource to a 3D printing task or request, cost, location or other criteria. The ranking may be based on a 3D printer identifier metric which may include, as discussed herein, a 3D printing quality metric, a 3D printing quantity metric, a 3D printer model number, a 3D printer serial number, a 3D print file type, and a 3D digital model type.

Figure 2:
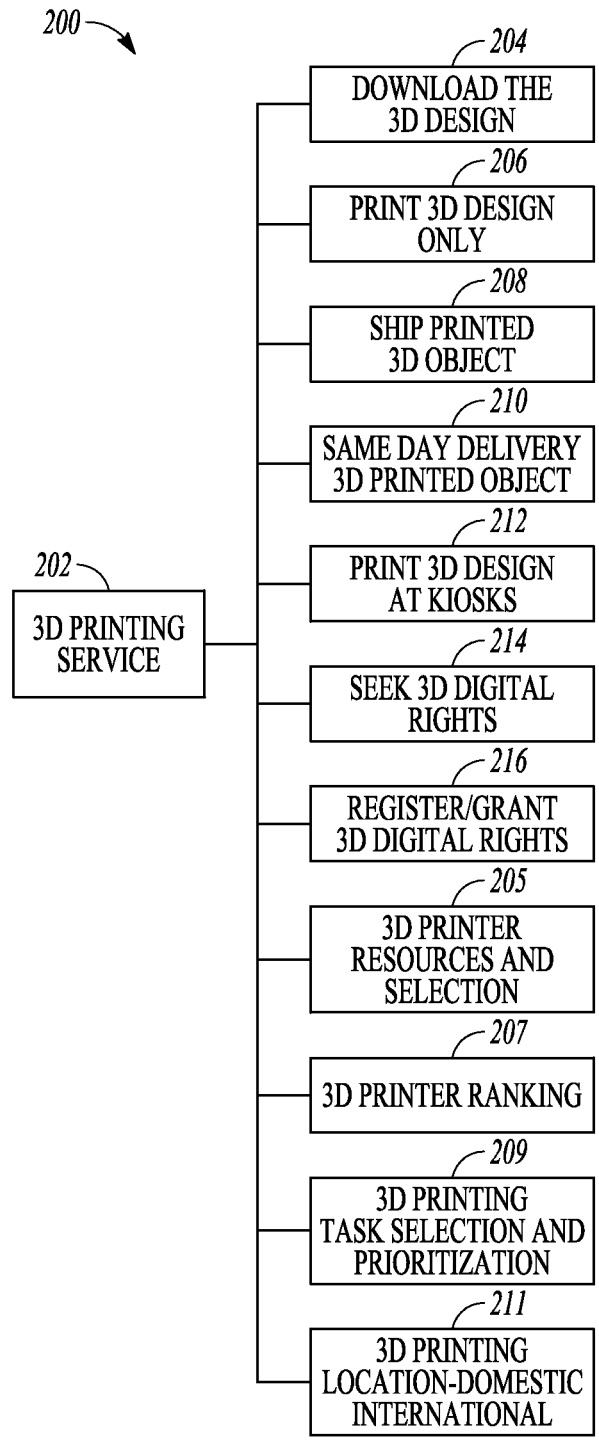
FIG. 2 illustrates example elements for inclusion in a graphical user interface, in accordance with some embodiments.

With reference to FIG. 2 of the accompanying drawings, an example interface 200 displayed by a 3D printing service may include, among other elements, an advertisement banner 202 and/or other type of visual or audible media suitable for an electronic storefront, mobile application interface, or website. In the example interface 200, user interface elements, such as "download the 3D design" 204, "print 3D design only" 206, "ship printed 3D object" 208, "same day delivery 3D printed object" 210, and "print 3D design at ebay kiosks" 212 are provided. In some examples, a "seek 3D digital rights" 214 and/or "register/grant 3D digital rights" 216 user interface elements are provided. In some examples, further user interface elements are provided allowing a buyer to select a check out flow using a third party payment service provider.

Further interface elements may be provided to help facilitate or optimize 3D printing activities in marketplaces allowing federated access to 3D printing resources. The access to printing resources may include direct access to 3D printing machines in some examples.

The present disclosure allows 3D printing resources to be identified, selected and ranked. 3D printing tasks can be customized and prioritized and the location of the 3D printing act (i.e., actual production of a printed 3D article) can be selected, for example, in tax-preferred locations, or in international waters. In this regard, user interface 200 may further include example user interface elements such as "3D printer resources and selection" 205, "3D printer ranking" 207, "3D printing task selection and prioritization" 209, and "3D printer location—domestic or international" 211. As used in this specification, the term "ranking" includes "listing" and, where appropriate, these terms are used interchangeably.

The user interface 200 is merely an example. The advertisement banner 202 and user interface elements 204-216 are merely examples. Many other examples of user interfaces and interface elements are possible.

Figure 3:
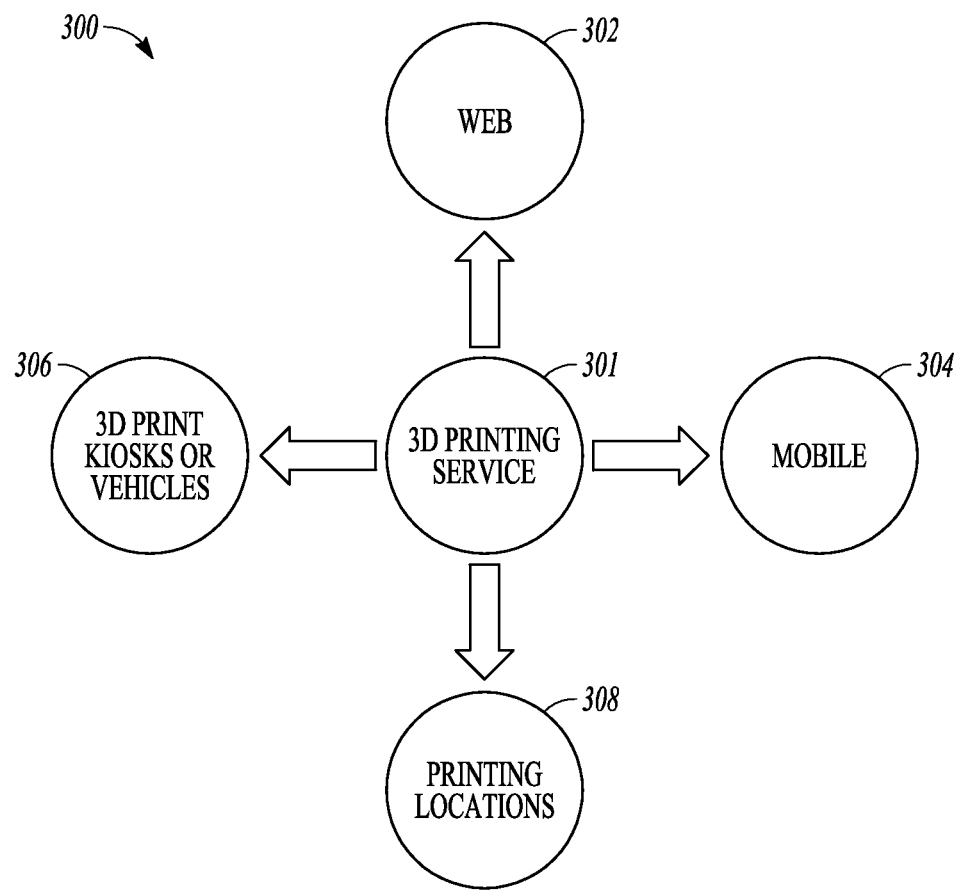
FIG. 3 is a schematic diagram of 3D printing service channels, in accordance with some embodiments.

With reference to FIG. 3, example 3D printing service channels in a 3D printing marketplace environment 300 can include a 3D printing service 301, web channels 302, mobile channels 304, 3D print kiosks or vehicles 306, and printing locations 308. The kiosks and vehicles 306, and printing locations 308 may be branded by a major retailer, 3D service provider, or an electronic marketplace host, for example.

In some examples, a 3D printing certification device (a symbol, graphic mark or word, brand, or trademark, for example) is displayed in a user interface associated with a 3D printing service 301 to attest to or confirm that authorized 3D printing rights have been granted to a certain 3D printing service 301, or other marketplace participant offering or engaged in the provision of 3D printing services. The device may be encrypted or made special in an appropriate manner so that the granting of genuine rights in digital models can be certified or assured. In some examples, use of the device or proxy by a 3D printing service provider (or other marketplace participant) can be restricted by the digital rights owner in relation to at least one aspect, for example, relating to a defined period, a geographic location or territory, defined buyers, defined 3D printed objects, defined uses, defined characteristics, and so forth. The restrictions may, for example, be based on a compliance with domestic or international statutes, regulations, contractual rights, safety laws, gun rights legislation, constitutional freedoms, and so forth.

In some examples, an owner of digital rights may authorize a printing service, marketplace host, or other marketplace participant to allow 3D printing of proprietary digital models based on acceptance of certain terms and conditions by the 3D printing service 301 or a buyer. The authorization may be a pre-authorization or provided on-demand, in some examples. The terms and conditions can be presented to a buyer in the course of the buyer selecting various example 3D printing options, such as those discussed further above. Payment for access to or exercise of granted digital rights, in addition to payment for 3D printing services, can also be enabled and presented to a buyer in the course of a check out flow. To this end, one or more third party payment services providers may be employed. A cost model can be created, for example, based on a purchase or delivery option selected by a buyer in a check out flow. In some examples, money flows or royalty streams due to a digital rights owner can be separated from income derived from the purchase of 3D printing services. Authentication devices may be employed to manage the exercise of digital rights, and some examples are discussed below.

In some examples, digital rights to brands, TV channels, movie rights, and other entertainment media are authorized and managed using the systems, methods, and media described herein. For example, a 3D certification device in an interface managing requests and authorizations to print 3D versions of Disney™ characters might include a depiction of Mickey Mouse. The depiction may include two- or three-dimensional views of Mickey Mouse, or a hologram effect, for example. The certification symbol may be associated with code or other credentials submitted to a 3D printing machine. The code or credentials may relate to specific modes, codes or numbers of 3D printing authorized by the digital rights owner. The code or other credentials may accompany a 3D printing request or instructions sent to a 3D printing facility, for example. The printing facility may be a kiosk or mobile 3D printing van, as discussed above. A great variety of 3D printing orders can be facilitated and fulfilled while preserving the rights of digital rights owners.

In some examples, a need for 3D printing of an object is posted in the online marketplace. For example, a user requiring a replacement case for a smartphone (for example, a Droid™ Razor™) can post this need and request 3D printing services 301 to create a replacement case. A price for fulfilment can be set by the user or a printer service (or other marketplace participant) at a fixed or variable price, by auction, RFP, or other manner, for example. An ability to seek authorization from or pay a royalty or fee to the owner of digital rights to the smart phone case (for example, Samsung) is provided.

In some examples, a digital model is verified before 3D printing to check that it is able to be printed in a certain form, or to exhibit certain characteristics after production. For example, to avoid a structural weakness or risk of breakage in a 3D printed object, a 3D printing service 301 or digital rights owner may provide instructions or algorithms to take into account a material choice, and an object configuration or size, to assess or ensure whether the object proposed to be 3D printed is able to stand unaided, or will not break. Other examples of verification criteria are possible. In some examples, prior verification of a digital model or proposed 3D object is important to a digital rights owner to avoid damage to a brand. A 3D printing run of thousands of Mickey Mouse™ figurines that each fall over, cannot maintain a pose, or can be broken easily by a child, can be harmful to a brand owner, and so the manner in which 3D printing is conducted may need to be controlled. Management of these additional aspects may be desirable even when a buyer or 3D service provider has otherwise sought or been granted 3D printing authorization using an example method or system described above. In some examples, a combination of certification devices, code, and/or credentials, and verification instructions or algorithms are employed by a digital rights owner, a 3D service provider (or other marketplace participant) to manage and fulfil 3D printing requests and fulfilment.

In some examples, an artifact or other device is caused to be embedded in a digital model or 3D printed object that disallows or controls further production. A "design fingerprint" can be employed in an encrypted or hidden manner to prevent unauthorized 3D scanning or printing of an object. In some examples, a chip, code, or tag embedded in an object, for example a Mickey Mouse™ figurine, can be scanned (or otherwise configured or interrogated) to authorize, control, or prevent 3D printing replication of the object one or more times, as may have been authorized by a digital rights owner (for example, Disney™ in the case of Mickey Mouse™). The chip, code, or tag is provided in some examples in an "original" version of the object that may have been created using casting, subtractive manufacturing, or other conventional manufacturing techniques. In some examples, the chip, code, or tag is included in a 3D printed replication of the object, or a digital model or scan from which the object can be made. In some examples, the chip, code, or tag is transmitted to a 3D printing service 301 or facility for inclusion in 3D objects that may be printed by that service or facility. The transmission may accompany 3D printing instructions sent to a printing facility (kiosk or mobile van, for example) by a 3D printing service 301. In some examples, a user (buyer, service provider, or other marketplace participant) can source a chip, code, or tag from a digital rights owner or an owner's agent. This sourcing may form part of the authorization operations discussed further above. In some examples, a digital rights owner may mandate inclusion of a chip, code, or tag in a 3D printed object when providing authorization to a user or 3D printing service 301.

In some examples, the rights managed by the inventive subject matter relate to compliance aspects, such as CBT, tax, customs, import, export, copyright, or other intellectual property. In one example, gun control authorities can manage or prevent the 3D replication of weapons, firearms, projectiles, ammunition, and so forth. In some examples, algorithms or code can be used to modify 3D printed objects to comply with local laws or regulations.

As mentioned above, the 3D printing marketplace may include or have access to a system of federated 3D printing services 301. The federated 3D printing services 301 may be ranked by a marketplace participant and displayed in order of user preference or based on other identified criteria identified by a user (e.g. consumer 108, FIG. 1). In some examples, an optimum or most suitable 3D printer at a 3D printing service for a given printing task can be identified or selected. An algorithm or other coding may be provided in one or more modules to select a 3D printer based on a file type, a digital model type, or a quality or capacity of a 3D printer based on a model number (or type), a serial number, a quality metric, or other identifier. In some cases, the selection may be automatic. In some cases, selection may be made by a user, for example consumer 108 (FIG. 1). In some examples, a test file or 3D object is printed for user (consumer) approval prior to a large printing run. For example, for a given number of 3D items to be printed, a test sample may be printed for error identification, consistency, conformity with a digital model, and the like. In other examples, a user may receive a relatively inexpensively 3D printed, or smaller 3D copy of a digital model to verify a given 3D design (or approve a 3D printing service or a specific 3D printer) before going into mass production.

In some examples, distribution, time, and quality rankings are made to determine an optimum 3D printing service (for example, printing service 301, FIG. 3) for a given object to be printed, and these may include services related to packing, shipping, and storing printed items from a selected 3D printing service or printer. For example, a user may wish to send a third party a gift in the form of a 3D printed object. A message or request may be relayed to a 3D printing service 301 (FIG. 3) using a user interface element (for example, of the type shown in interface 200 (FIG. 2)). An algorithm or other selection coding at a 3D printing service 301 determines how to prioritize queued 3D printing jobs, in some examples. In further examples, the algorithm or coding may identify an optimum pickup station in a print shop.

In some examples of marketplace environments, an auction bidding or tendering process may be provided or facilitated. For example, a 3D printing service 301 may access an interface (for example, an appropriate interface 200 discussed above) to identify one or more user-requested 3D printing jobs published or advertised in the marketplace environment 300 as being available for fulfilment. The 3D printing service 301 may specify a price or tender to fulfil the order based, for example, on the functionality and capability of 3D printers located or owned by the 3D printing service 301, or available through access to 3D printers federally available to it, or in the marketplace environment 300 generally. In some examples, 3D printing services may be offered in different ways for different products, or different price points may be specified by a 3D printing service 301 (FIG. 3) or consumer 108 (FIG. 1) for 3D printing of the same or similar designs (or digital model) depending on aspects such as printer availability, capacity, prioritization in a printing task queue, and so forth.

Thus, in some embodiments, a system comprises a memory; and at least one module, executing on one or more computer processors, to host or participate in a 3D printing service marketplace environment including marketplace participants and a federated network of 3D printing service providers; receive a 3D printing request from a marketplace participant to print a 3D object at a 3D printing service provider; and communicate with at least some of the federated network of 3D printer service providers within the marketplace environment and, in response to the received request, rank at least some of the 3D printing service providers based on a 3D printer identifier metric.

In some examples, the 3D printer identifier metric may include one or more of: a 3D printing quality metric; a 3D printing quantity metric; a 3D printer model number; a 3D printer serial number; a 3D print file type; and a 3D digital model type. The at least one module may further receive the 3D printer identifier metric from the marketplace participant requesting printing of the 3D object, and rank at least some of the 3D printing service providers based on the received 3D printer identifier metric.

In some examples, the at least one module is further to permit the marketplace participant to initiate a request for authorization to print the 3D object from an owner of digital rights in the 3D object. In some examples, the 3D printing marketplace environment further includes a mobile 3D printing service and wherein the at least one module is further to specify, in the ranking of at least some of the 3D printing service providers, the location of the mobile 3D printing service.

In some examples, the at least one module may further receive a tender from at least one of the 3D printing services in the federated network of 3D printing service providers to fulfil the 3D printing request.

In some embodiments, a non-transitory machine-readable medium may include a set of instructions that, when executed by a machine, cause the machine to perform any of the operations, functions, and method steps discussed within the present disclosure.

Figure 4:
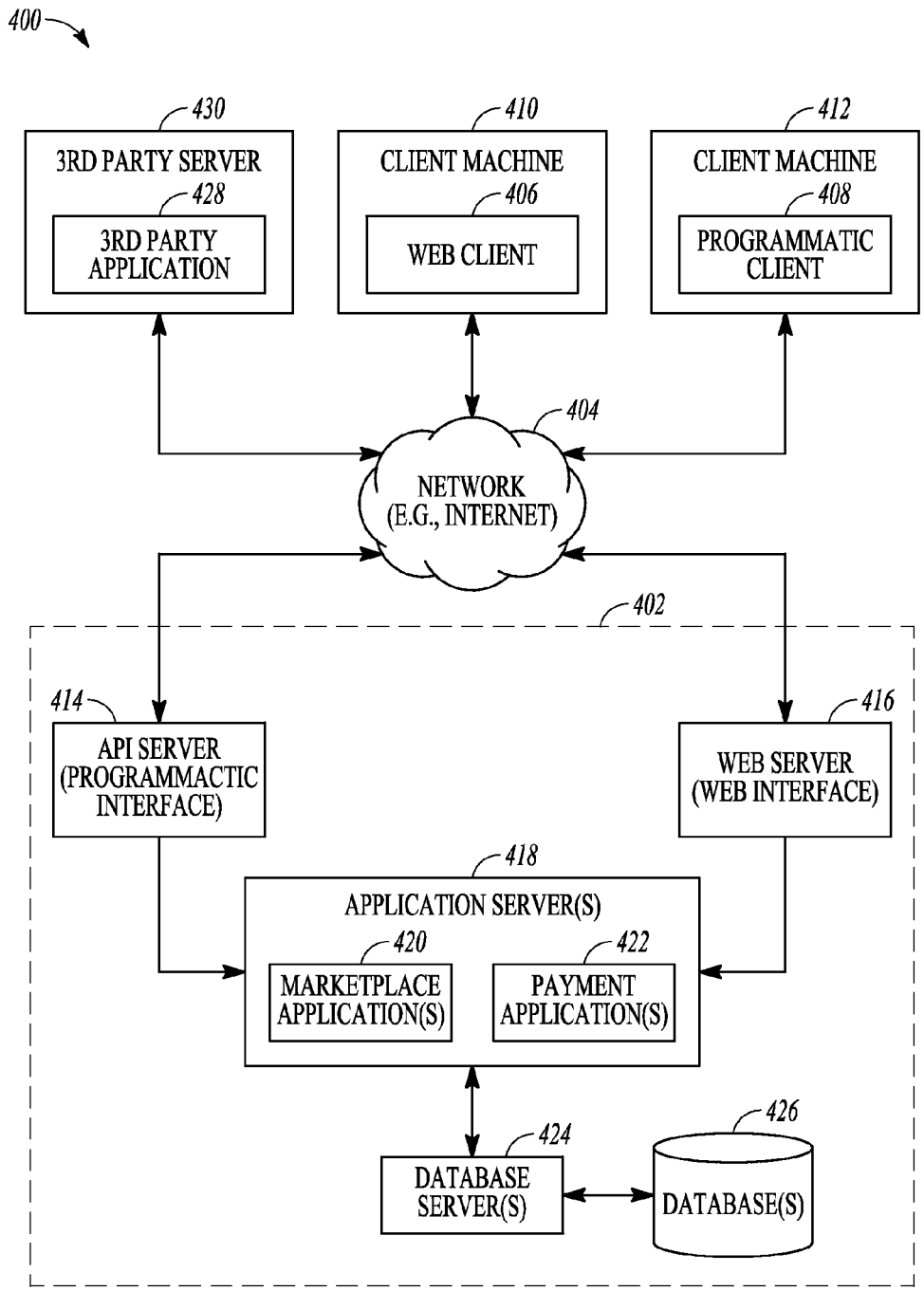
FIG. 4 illustrates a network diagram depicting an example system, in accordance with some embodiments.

Turning now to the accompanying drawings, FIG. 4 illustrates a network diagram depicting an example system 400 for facilitating 3D printing services provided in a 3D printing service marketplace (e-commerce environment) according to some embodiments. A networked system 402 forms a network-based system that provides server-side functionality, via a network 404 (e.g., the Internet or wide area network (WAN)), to one or more clients and devices. FIG. 4 further illustrates, for example, one or both of a web client 406 (e.g., a web browser) and a programmatic client 408 executing on client machines 410 and 412. In one embodiment, the system 400 comprises a marketplace system. In another embodiment, the system 400 comprises other types of systems such as, but not limited to, a social networking system, a matching system, an electronic commerce (e-commerce) system, and the like.

Each of the client machines 410, 412 comprises a computing device that includes at least a display and communication capabilities with the network 404 to access the networked system 402. The client machines 410, 412 comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 410, 412 may connect with the network 404 via a wired or wireless connection. For example, one or more portions of network 404 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network 404, or a combination of two or more such networks 404.

Each of the client machines 410, 412 includes one or more applications (also referred to as "apps") such as, but not limited to, a web browser, messaging application, electronic mail (email) application, an e-commerce site application (also referred to as a marketplace application, including 3D printing service applications), and the like. In some embodiments, if the e-commerce site application is included in a given one of the client machines 410, 412, then this application is configured to locally provide the user interface and at least some of the functionalities with the application configured to communicate with the networked system 402, on an as needed basis, for data and/or processing capabilities not locally available (such as access to a database of items available for sale, 3D printing services available, authentication of a user, verification of a method of payment, etc.). Conversely, if the e-commerce site application is not included in a given one of the client machines 410, 412, the given one of the client machines 410, 412 may use its web browser to access the e-commerce site (or a variant thereof) hosted on the networked system 402. Although two client machines 410, 412 are shown in FIG. 4, more or less than two client machines can be included in the system 400.

An application program interface (API) server 414 and a web server 416 are coupled to, and provide programmatic and web interfaces respectively to, one or more application servers 418. The application servers 418 host one or more marketplace applications 420 and payment applications 422. The marketplace applications 420 can include 3D printing service applications to perform any of the operations, functions, and method steps discussed within the present disclosure. The application servers 418 are, in turn, shown to be coupled to one or more database servers 424 that facilitate access to one or more databases 426.

The marketplace applications 420 may provide a number of e-commerce functions and services to users that access networked system 402. E-commerce functions/services may include a number of publisher functions and services (e.g., search, listing, content viewing, payment, etc.). For example, the marketplace applications 420 may provide a number of services and functions to users for listing goods and/or services or offers for goods and/or services for sale, searching for goods and services, facilitating transactions, and reviewing and providing feedback about transactions and associated users. The services can include 3D printing services. Additionally, the marketplace applications 420 may track and store data and metadata relating to listings, transactions, 3D service providers, rankings, and user interactions. The data can include digital rights data, digital rights certification and registration, and digital model and 3D object verification data of the type discussed elsewhere in this specification. In some embodiments, the marketplace applications 420 may publish or otherwise provide access to content items stored in application servers 418 or databases 426 accessible to the application servers 418 and/or the database servers 424. In some embodiments, the marketplace applications allow cooperative communication with a federated network of 3D printer service providers within a marketplace environment (for example, 300 in FIG. 3) and, in response to the received request, allow ranking at least some of the 3D printing service providers. The ranking may be based on a 3D printer identifier metric.

The payment applications 422 may likewise provide a number of payment services and functions to users. The payment applications 422 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 420. The payment applications 422 may regulate payment to sellers for goods and/or services sold in the marketplace and direct a portion of the proceeds to a marketplace controller for use of susceptibility profiles for boosting the conversion of sales. The payment applications 422 may allow collection or payment of royalty fees and the like for use of digital rights associated with requests or fulfilment of 3D printing tasks. The payment applications 422 may be configured or coded to allow any of the money-related operations, functions, and method steps discussed within the present disclosure.

While the marketplace and payment applications 420 and 422 are shown in FIG. 4 to both form part of the networked system 402, it will be appreciated that, in alternative embodiments, the payment applications 422 may form part of a payment service that is separate and distinct from the networked system 402. In other embodiments, the payment applications 422 may be omitted from the system 400. In some embodiments, at least a portion of the marketplace applications 420 may be provided on the client machines 410 and/or 412.

Further, while the system 400 shown in FIG. 4 employs a client-server architecture, embodiments of the present disclosure are not limited to such an architecture, and may equally well find application in, for example, a distributed or peer-to-peer architecture system. The various marketplace and payment applications 420 and 422 may also be implemented as standalone software programs, which do not necessarily have networking capabilities.

The web client 406 accesses the various marketplace and payment applications 420 and 422 via the web interface supported by the web server 416. Similarly, the programmatic client 408 accesses the various services and functions provided by the marketplace and payment applications 420 and 422 via the programmatic interface provided by the API server 414. The programmatic client 408 may, for example, be a seller application (e.g., the TurboLister application developed by eBay Inc., of San Jose, Calif.) to enable sellers to author and manage listings on the networked system 402 in an off-line manner, and to perform batch-mode communications between the programmatic client 408 and the networked system 402.

FIG. 4 also illustrates a third party application 428, executing on a third party server machine 430, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace, 3D printing service, or payment functions that are supported by the relevant applications of the networked system 402.

Figure 5:
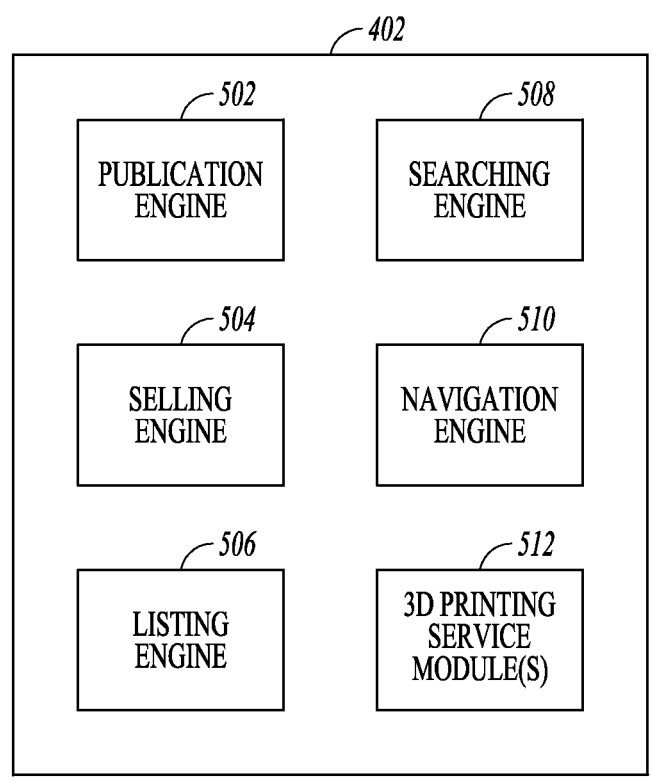
FIG. 5 illustrates a block diagram of additional details of the example system of FIG. 4, in accordance with some embodiments.

FIG. 5 illustrates a block diagram showing components provided within the networked system 402, according to some embodiments. The networked system 402 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 426 via the database servers 424.

The networked system 402 may provide a number of publishing, listing, and/or price-setting mechanisms whereby a seller (also referred to as a first user) may list (or publish information concerning) goods or services (including 3D printing services) for sale or barter, a buyer (also referred to as a second user) can express interest in or indicate a desire to purchase or barter such goods or services, and a transaction (such as a trade) may be completed pertaining to the goods or services. To this end, the networked system 402 may comprise at least one publication engine 502 and one or more selling engines 504. The publication engine 502 may publish information, such as item or service listings or product description pages, on the networked system 402. In some embodiments, the selling engines 504 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 504 may further comprise one or more deal engines that support merchant-generated offers for products and services.

A listing engine 506 allows sellers to conveniently author listings of items or authors to author publications. In one embodiment, the listings pertain to goods or services (including 3D printing services) that a user (e.g., a seller) wishes to transact via the networked system 402. In some embodiments, the listing may be an offer, deal, coupon, or discount for the good or service. Each good or service is associated with a particular category. The listing engine 506 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 402 (e.g., databases 426). Listings also may comprise product description pages that display a product and information (e.g., product title, specifications, and reviews) associated with the product. In some embodiments, the product description page may include an aggregation of item listings that correspond to the product described on the product description page.

The listing engine 506 also may allow buyers to conveniently author listings or requests for items desired to be purchased. In some embodiments, the listings may pertain to goods or services that a user (e.g., a buyer) wishes to transact via the networked system 402. Each good or service is associated with a particular category. The listing engine 506 may receive as much or as little listing data, such as title, description, and aspect name/value pairs, as the buyer is aware of about the requested item. In some embodiments, the listing engine 506 may parse the buyer's submitted item information and may complete incomplete portions of the listing. For example, if the buyer provides a brief description of a requested item, the listing engine 506 may parse the description, extract key terms, and use those terms to make a determination of the identity of the item. Using the determined item identity, the listing engine 506 may retrieve additional item details for inclusion in the buyer item request. In some embodiments, the listing engine 506 may assign an item identifier to each listing for a good or service.

In some embodiments, the listing engine 506 allows sellers to generate offers for discounts on products or services. The listing engine 506 may receive listing data, such as the product or service being offered, a price and/or discount for the product or service, a time period for which the offer is valid, and so forth. In some embodiments, the listing engine 506 permits sellers to generate offers from the sellers' mobile devices. The generated offers may be uploaded to the networked system 402 for storage and tracking. In some embodiments, the selling engine 504 or the listing engine 506 allows a user to request use of susceptibility profiles in offering the listed items for sale in the marketplace.

Searching the networked system 402 is facilitated by a searching engine 508. For example, the searching engine 508 enables keyword queries of listings published via the networked system 402. In example embodiments, the searching engine 508 receives the keyword queries from a device of a user and conducts a review of the storage device storing the listing information. The review will enable compilation of a resulting set of listings that may be sorted and returned to the client device (e.g., client machine 410, 412) of the user. The searching engine 508 may record the query (e.g., keywords) and any subsequent user actions and behaviors (e.g., navigations).

The searching engine 508 also may perform a search based on the location of the user. A user may access the searching engine 508 via a mobile device and generate a search query. Using the search query and the user's location, the searching engine 508 may return relevant search results for products, services, offers, auctions, and so forth to the user. The searching engine 508 may identify relevant search results both in a list form and graphically on a map. Selection of a graphical indicator on the map may provide additional details regarding the selected search result. In some embodiments, the user may specify a radius or distance from the user's current location as part of the search query in order to limit search results.

The searching engine 508 also may perform a search based on an image. The image may be taken from a camera or imaging component of a client device or may be accessed from storage.

In a further example, a navigation engine 510 allows users to navigate through various categories, catalogs, or inventory data structures according to which listings may be classified within the networked system 402. For example, the navigation engine 510 allows a user to successively navigate down a category tree comprising a hierarchy of categories (e.g., the category tree structure) until a particular set of listings is reached. Various other navigation applications within the navigation engine 510 may be provided to supplement the searching and browsing applications. The navigation engine 510 may record the various user actions (e.g., clicks) performed by the user in order to navigate down the category tree.

In some embodiments, one or more 3D printing service modules 512 may be configured to create and implement the 3D printing service 310, certification, registration, verification and other 3D printing selection, facilitation, customization, and optimization functions and methods described in this specification. It is contemplated that the 3D printing service module(s) 512 may be further configured to provide or perform any of the features, functions, methods or operations related to 3D printing disclosed herein.

The various units, devices and modules depicted in FIGS. 4-5 may cooperate with one another to optimize or facilitate 3D printing services in a marketplace environment. Further modules, components and functionality may be employed as follows.

In some examples, a computer implemented system 400 is provided for managing digital rights pertaining to the 3D printing of digital models. The system 400 may include a computing device that implements a 3D printing marketplace component wherein the marketplace component further comprises a merchant unit, a transaction unit, a consumer unit, and a digital rights authorization unit wherein the merchant unit, the transaction unit, the consumer unit, and the digital rights authorization unit cooperatively act to: receive a request from a consumer for a 3D printing task; rank a plurality of 3D printing service providers based on an availability or a suitability to fulfil the 3D printing task, or by other criteria received from the consumer; enable the consumer or a 3D service provider selected by the consumer to seek a 3D printing authorization from an owner of digital rights associated with the requested 3D printing task; enable the owner of digital rights to publish or convey a 3D printing authorization to the consumer or selected 3D service provider; and collect, from the consumer or selected 3D service provider, a royalty or fee in consideration of a user authorization. The units may also act cooperatively to collect a payment from the consumer for fulfilment of the requested 3D printing task. In some examples, the units may also act cooperatively to publish or convey to the 3D printing marketplace a certified pre-authorization granted by a digital rights owner for 3D printing tasks or services.

Additional modules and engines associated with the networked system 402 are described below in further detail. It should be appreciated that modules or engines may embody various aspects of the details described below.

Figure 6:
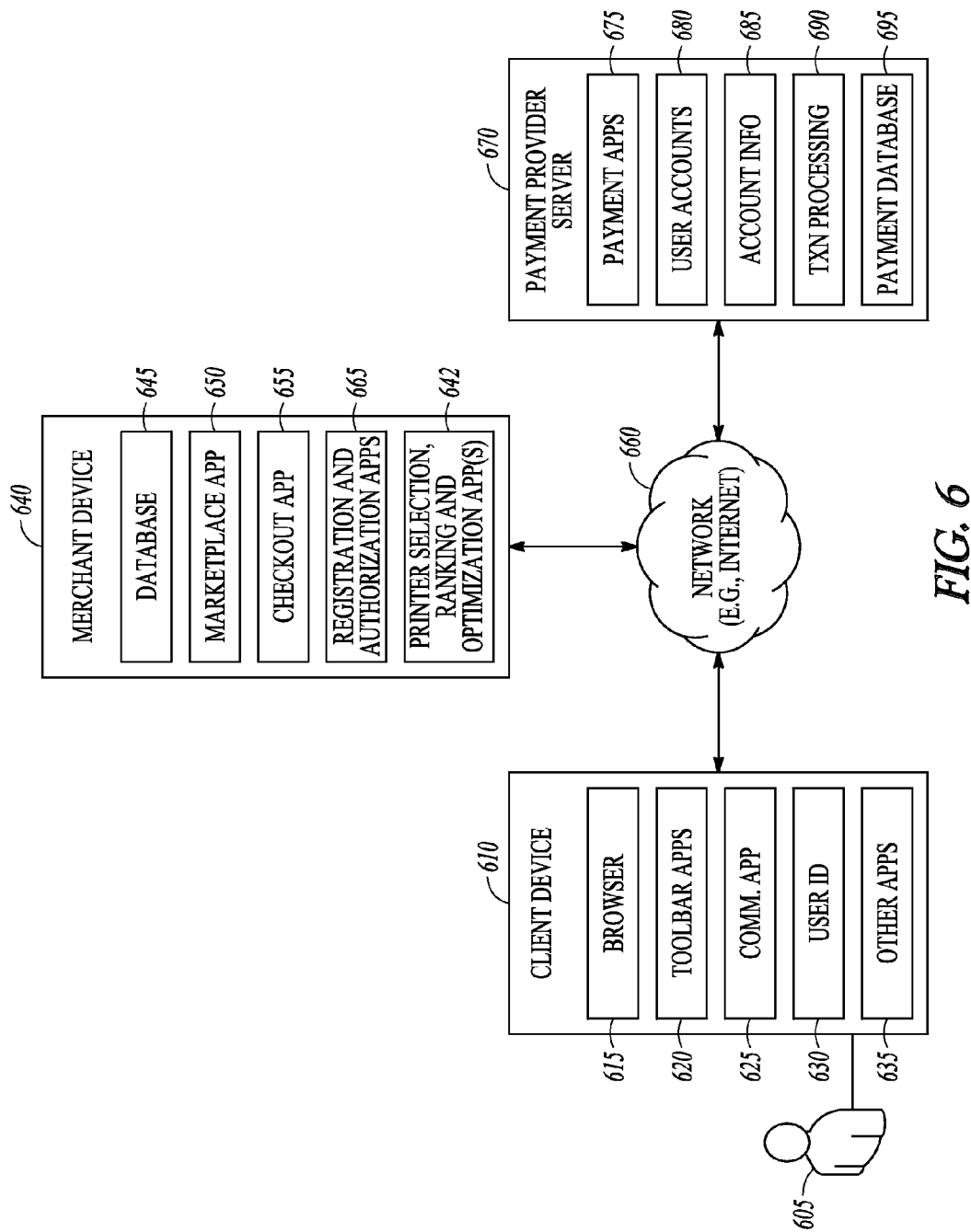
FIG. 6 illustrates a network diagram depicting an example system, in accordance with some embodiments.

FIG. 6 is a block diagram of a networked system 600 configured to handle processes, such as described herein, in accordance with some embodiments. System 600 includes a client device 610, a merchant device (e.g., server) 640, and a payment provider server 670 in communication over a network 660. Payment provider server 670 may be maintained by a service or payment provider, such as Pay Pal, Inc. or eBay, Inc. of San Jose, Calif. A user 605, such as a consumer, may utilize client device 610 to make a purchase transaction, facilitated by payment provider server 670, with one or more merchants.

Client device 610, merchant device 640, and payment provider server 670 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

Network 660 may be implemented as a single network or a combination of multiple networks. For example, in various embodiments, network 660 may include the Internet or one or more intranets, landline networks, wireless networks, and/or other appropriate types of networks.

Client device 610 may be implemented using any appropriate hardware and software configured for wired and/or wireless communication over network 660. For example, in one embodiment, the client device 610 may be implemented as a PC, a smart phone, PDA, laptop computer, and/or other types of computing devices capable of transmitting and/or receiving data, such as an iPad™ from Apple™.

Client device 610 may include one or more browser applications 615 which may be used, for example, to provide a convenient interface to permit user 605 to browse information available over network 660. For example, in one embodiment, browser application 615 may be implemented as a web browser configured to view information available over the Internet or access a website of the payment provider. Client device 610 may also include one or more toolbar applications 620 which may be used, for example, to provide client-side processing for performing desired tasks in response to operations selected by user 605. In some embodiments, toolbar application 620 may display a user interface in connection with browser application 615.

Client device 610 may further include other applications 635 as may be desired in particular embodiments to provide desired features to client device 610. For example, other applications 635 may include security applications for implementing client-side security features, programmatic client applications for interfacing with appropriate APIs over network 660, or other types of applications. Applications 635 may also include email, texting, voice, and IM applications that allow user 605 to send and receive emails, calls, texts, and other notifications through network 660. Client device 610 may include one or more user identifiers 630 which may be implemented, for example, as operating system registry entries, cookies associated with browser application 615, identifiers associated with hardware of client device 610, or other appropriate identifiers, such as used for payment/user/device authentication or identification. In some embodiments, user identifier 630 may be used by a payment service provider to associate user 605 with a particular account maintained by the payment provider. A communications application 625, with associated interfaces, enables client device 610 to communicate within system 600.

Merchant device 640 may be maintained, for example, by a merchant or seller offering various items, products, and/or services (including 3D printing services) through an online site or app. Generally, merchant device 640 may be maintained by anyone or any entity that receives money, which includes charities as well as retailers and restaurants. Merchant device 640 may include a database 645 identifying available products and/or services (e.g., collectively referred to as items), which may be made available for viewing and purchase by user 605. Merchant device 640 may also include a marketplace application 650 (including one or more 3D printing service applications) which may be configured to serve information over network 660 to browser application 615 of client device 610 and/or payment provider server 670. In one embodiment, user 605 may interact with marketplace application 650 to view various 3D printing services 310 available for purchase from the merchant.

Merchant device 640 may also include a checkout application 655, which may be configured to facilitate the purchase by user 605 of 3D printed objects or 3D printing services 310 identified by marketplace application 650. Checkout application 655 may be configured to accept payment information from or on behalf of user 605 through payment provider server 670 over network 660. For example, checkout application 655 may receive and process a payment confirmation from payment provider server 670, as well as transmit transaction information to the payment provider and receive information from the payment provider (e.g., a transaction ID). Checkout application 655 may also be configured to accept one or more different funding sources for payment.

Merchant device 640 may also include registration and authorization applications 665 allowing the management of digital rights to 3D printed objects and digital models in accordance with any of the operations, functions, and methods described elsewhere in this specification. For example, an owner of digital rights can use a registration and authorization application 665 to register rights vesting in a given 3D object or digital model, or to publish or regulate those rights to the 3D marketplace environment. In other examples, a 3D printing service provider can use a registration and authorization application 665 to certify or verify a 3D object or digital model before 3D printing. Other examples as set forth in the method operations discussed below are possible. Merchant device 640 may also include 3D printer selection, ranking, and optimization applications 642 allowing the any of the 3D printing operations, functions and methods described herein.

Payment provider server 670 may be maintained, for example, by an online service provider which may provide payment between user 605 and the operator of merchant device 640. In this regard, payment provider server 670 includes one or more payment applications 675, which may be configured to interact with client device 610 and merchant device 640 over network 660 to facilitate the purchase of goods or services by user 605 of client device 610 as well as search merchant offerings and prices as discussed above.

Payment provider server 670 may also maintain a plurality of user accounts 680, each of which may include account information 685 associated with individual users 605. For example, account information 685 may include susceptibility profile data or private financial information of users 605 of devices such as account numbers, passwords, device identifiers, user names, phone numbers, credit card information, bank information, or other financial information that may be used to facilitate online transactions by user 605. Account information 685 may also include information associated with the payment process described herein. Advantageously, payment application 675 may be configured to interact with merchant device 640 on behalf of user 605 during a transaction with checkout application 655 to handle payments.

A transaction processing application 690, which may be part of payment application 675 or separate, may be configured to receive information from a client device 610 and/or merchant device 640 for processing and storage in a payment database 695 as described above. Transaction processing application 690 may include one or more applications to process information from user 605 and/or the merchant for processing a transaction from client device 610 as described herein. As such, transaction processing application 690 may store details of a transaction or from an email, and associate the details accordingly for individual users 605. The transaction processing application 690 may also regulate payments between a user 605 and a marketplace controller, based, for example, on use by the user 605 of the stored susceptibility profiles. Payment application 675 may be further configured to determine the existence of and to manage accounts for user 605, as well as to create new accounts if needed, performing tasks such as set-up, digital rights management, and providing various services as described herein.

Figure 7:
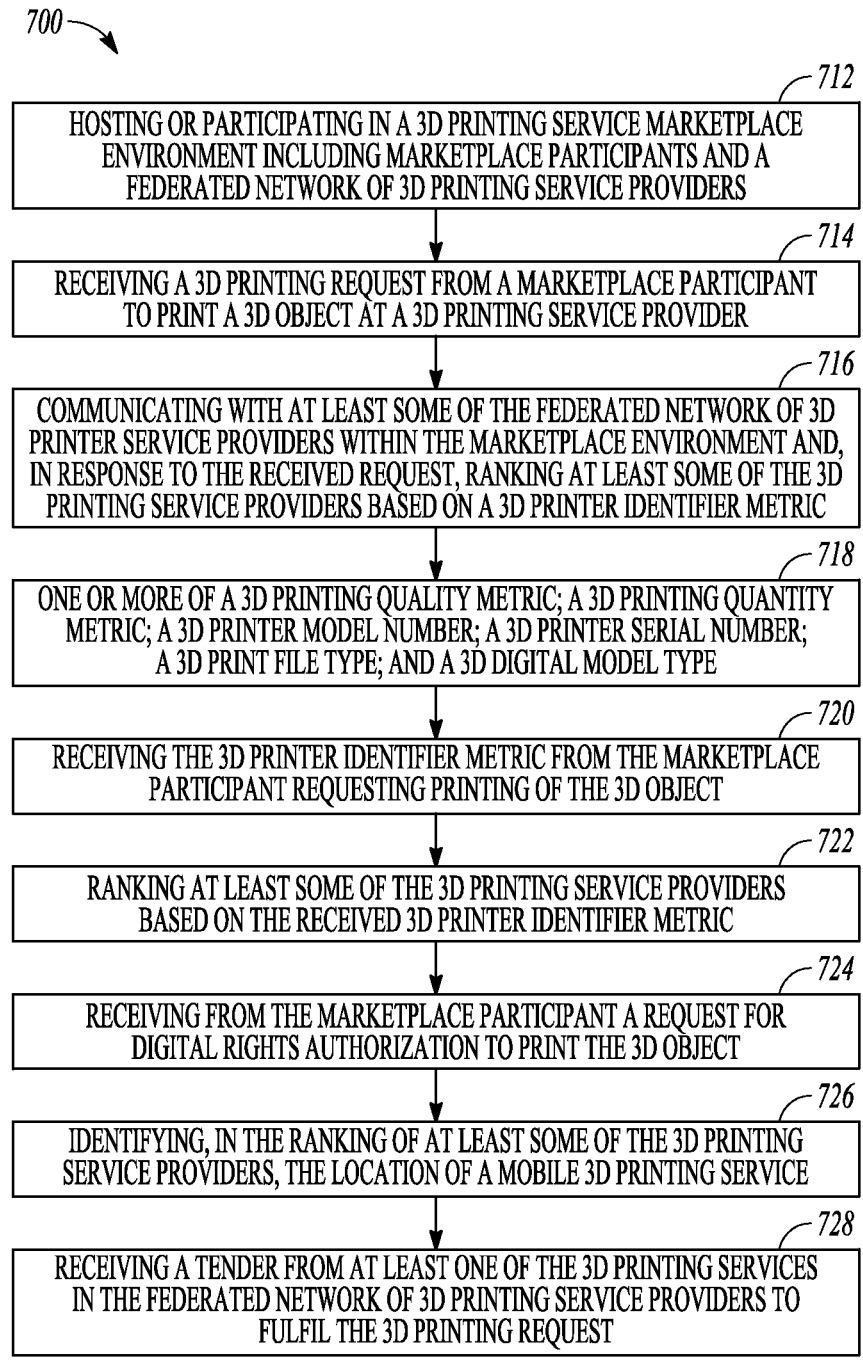
FIG. 7 is a flowchart illustrating example method operations, in accordance with some embodiments.

Some of the embodiments disclosed herein include methods. FIG. 7 is a flowchart illustrating one such method. The operations of the method 700 may be performed by the client machine 410, client machine 412, client device 610, merchant device 640, and/or a server included in the networked system 402 (e.g., API server 414, web server 416, or application servers 418). The operations may be performed by modules (e.g., 3D printing service module(s) 512). The various operations of the method 700 may be performed in different orders, and the method 700 may include only some of the operations described below.

The method 700 may include, at operation 712, hosting or participating in a 3D printing service marketplace environment including marketplace participants and a federated network of 3D printing service providers; at operation 714, receiving a 3D printing request from a marketplace participant to print a 3D object at a 3D printing service provider; and, at operation 716, communicating with at least some of the federated network of 3D printer service providers within the marketplace environment and, in response to the received request, ranking at least some of the 3D printing service providers based on a 3D printer identifier metric. The 3D printer identifier metric may include, at operation 718, using one or more of a 3D printing quality metric; a 3D printing quantity metric; a 3D printer model number; a 3D printer serial number; a 3D print file type; and a 3D digital model type.

In some examples, the method 700 further includes, at operation 720, receiving the 3D printer identifier metric from the marketplace participant requesting printing of the 3D object and, at operation 722, ranking at least some of the 3D printing service providers based on the received 3D printer identifier metric.

In some examples, the method 700 further comprises, at operation 724, receiving from the marketplace participant a request for digital rights authorization to print the 3D object.

In some examples, the method 700 further comprises, at operation 726, identifying, in the ranking of at least some of the 3D printing service providers, the location of a mobile 3D printing service.

In some examples, the method 700 further comprises, at operation 728, receiving a tender from at least one of the 3D printing services in the federated network of 3D printing service providers to fulfil the 3D printing request.

These and other variations in the performance of the method 700 are within the scope of embodiments of the present disclosure.

Additional Details and Features

In some embodiments, additional details and features can be provided. In some examples, a service is provided to a user 605 or consumer that enables an enhanced online shopping experience. In various embodiments, the user 605 may select an item of interest, save it for a specific occasion/category, and share all saved items in the category to a closed group or open group of other users 605. The user 605 may share a list of one or more items, along with quantity desired, so that others may see and purchase items for the user 605.

The user 605 may see a "best" or "ranked" price for the item across the Internet and not just from a single merchant or single site. The user 605 may also see a list of "best" prices from different merchants and locations so that the user 605 can select what is "best" or most desirable for the user 605, including if and where the item is available for local pick up. The system may determine user 605 preferences, such as sizes, colors, and other item features, from previous purchases, so that when items are returned, they include "desired" or previously purchased user 605 features.

A list of saved items of interest may be shown on a single page from different online merchants. The list or display of items may show items that have been placed in a cart to be purchased, have already been purchased, or are still waiting for possible purchase. The user 605 may drag and drop or otherwise place individual items on the display in a single cart on a user 605 display. The single cart may show all selected items with the site or merchant that is offering the item. Once ready for purchase, the user 605 may see a pre-populated screen of a shipping address, shipping option, and funding source, which the user 605 can edit if desired.

With an item or list that is shared from another, the user 605 may select a desired item from the list for purchase. The user 605 may then see a pre-populated screen showing the recipient name and shipping address (such as of the person who shared the list with the user 605). The user 605 may also be sent notifications, such as through text messages, when the item is available at or below a certain user-specified price.

In some embodiments, a user 605 may express interest in an item. The system can search for best deals for that item across the web, including any coupons that can be applied. Deals may be color-coded to help visualize best deals. The user 605 can also indicate that a particular item is too expensive, but wants to see less expensive similar items, look-alikes, and/or knock-offs, and the system will return such a list to the user 605. The service provider may also provide information to merchants to help them provide more useful offers or recommendations to users 605 and increase the likelihood of a sale.

It is contemplated that any of the features and/or embodiments discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 404 of FIG. 4) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network 660. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
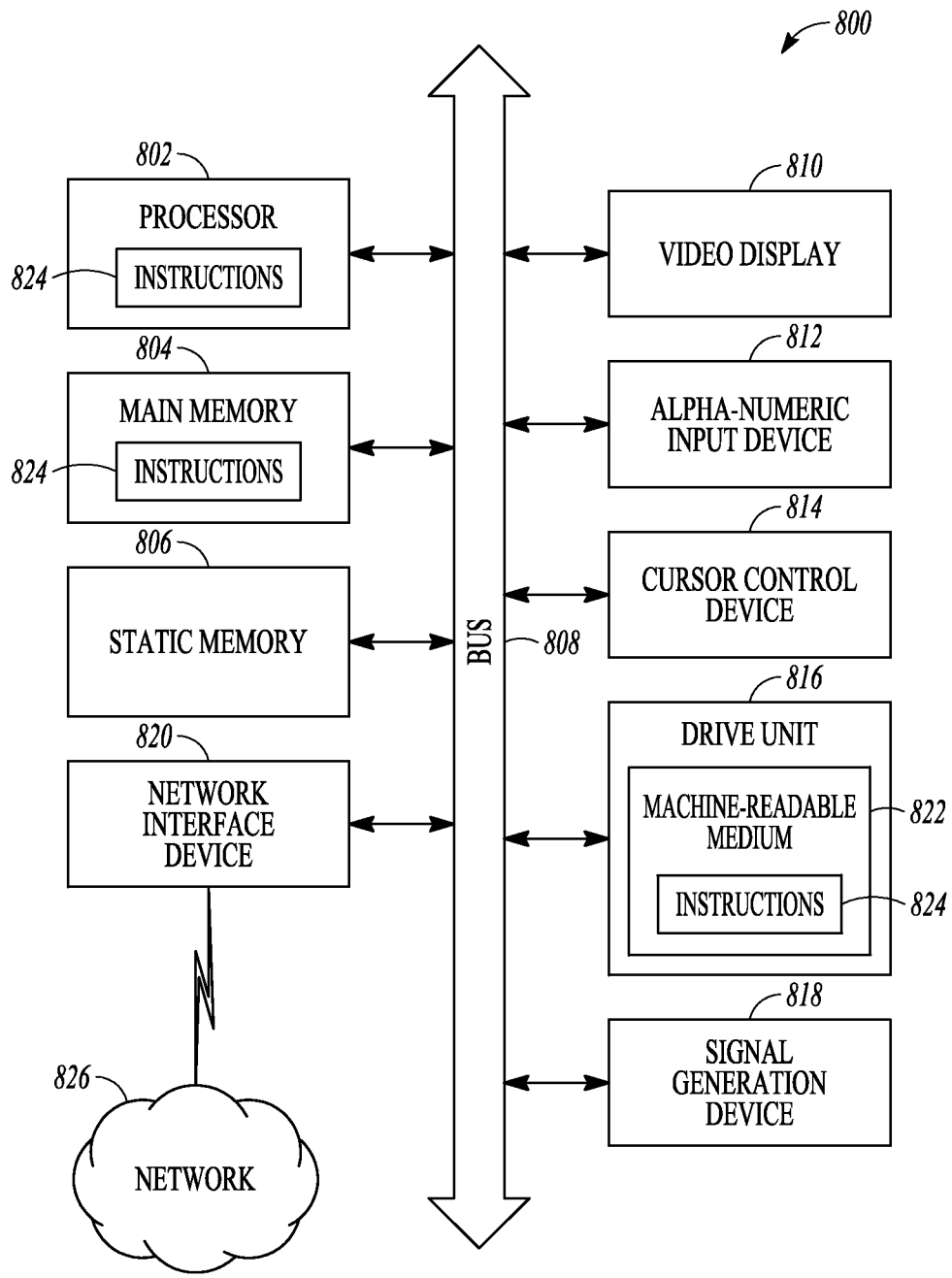
FIG. 8 shows a diagrammatic representation of a machine in the example form of a computer system within which a set of instructions may be executed to cause the machine to perform any one or more of the methodologies discussed herein, in accordance with some embodiments.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a PDA, a cellular telephone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute a set (or multiple sets) of instructions 824 to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media 822. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present embodiments, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communications networks 826 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 824 for execution by the machine, and includes digital or analog communications signals or other intangible media to facilitate communication of such instructions 824.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    a federated network of 3D printing service providers, including at least one 3D printer; a hosting system including one or more computer processors, the hosting system further including one or more modules and a memory configured to enhance a 3D printing service marketplace environment hosted by the hosting system, including 3D print data for a selection of 3D objects provided by marketplace participants and a selection of 3D printing service providers from among the federated network of 3D printing service providers, the enhancing including configuring the one or more computer processors to:
    receive a 3D printing request to print a 3D object selected from the plurality of 3D objects;
    responsive to the 3D printing request and the selection of the 3D object from the plurality of 3D objects, list at least some of the 3D printing service providers based on a 3D printer identifier metric, the 3D printer identifier metric including a 3D printing quality metric, a 3D digital model type, and a digital rights authorization that corresponds to the 3D printing request, the digital rights authorization including an indication that a respective 3D printing service provider of the listed 3D printing service providers is authorized to print the 3D object;
    receive a selection of a preferred 3D printing service provider from among the list of at least some of the 3D printing service providers, and
    based on a selection of a 3D object and 3D service provider, causing a 3D digital file to be transmitted to the selected 3D service provider to print the 3D object.

2. The system of claim 1, wherein the 3D printer identifier metric further includes one or more of:
    a 3D printing quantity metric;
    a 3D printer model number;
    a 3D printer serial number; and
    a 3D print file type.

3. The system of claim 1, wherein the at least one module is further to permit the marketplace participant to initiate a request for authorization to print the 3D object from an owner of digital rights in the 3D object.

4. The system of claim 1, wherein the 3D printing marketplace environment further includes a mobile 3D printing service; and
    wherein the at least one module is further to specify, in the listing of at least some of the 3D printing service providers, a location of the mobile 3D printing service.

5. The system of claim 1, wherein the at least one module is further to receive a tender from at least one of the 3D printing services in the federated network of 3D printing service providers to fulfil the 3D printing request.

6. A method comprising:
    enhancing a 3D printing service marketplace environment hosted by a hosting system, including 3D print data for a selection of 3D objects provided by marketplace participants, and 3D printing service providers from among a federated network of 3D printing service providers, the enhancing of the 3D printing service marketplace environment including incorporating one or more modules into a memory of the hosting system, the one or more modules configuring one or more computer processors of the hosting system to perform operations comprising:
    receiving a 3D printing request to print a 3D object selected from the plurality of 3D objects;
    responsive to the 3D printing request and the 3D object selected from among the selection of 3D objects, listing at least some of the 3D printing service providers based on a 3D printer identifier metric, the 3D printer identifier metric includes a 3D printing quality metric, a 3D digital model type, and a digital rights authorization corresponding to the 3D printing request, the digital rights authorization including an indication that a respective 3D printing service provider of the listed 3D printing service providers is authorized to print the 3D object;
    receiving a selection of a preferred 3D printing service provider from among the list of at least some of the 3D printing service providers.

7. The method of claim 6, wherein the 3D printer identifier metric further includes one or more of:
    a 3D printing quantity metric;
    a 3D printer model number;
    a 3D printer serial number; and
    a 3D print file type.

8. The method of claim 6, further comprising receiving from the marketplace participant a request for digital rights authorization to print the 3D object.

9. The method of claim 6, further comprising identifying, in the listing of at least some of the 3D printing service providers, a location of a mobile 3D printing service.

10. The method of claim 6, further comprising receiving a tender from at least one of the 3D printing services in the federated network of 3D printing service providers to fulfil the 3D printing request.

11. A non-transitory machine-readable medium comprising a set of instructions that, when incorporated into a hosting system as one or more modules implemented by at least one computer processors of the hosting system, cause the at least one computer processors to perform operations to enhance a 3D printing service marketplace environment hosted by the hosting system, the operations comprising:

hosting a 3D printing service marketplace environment including receiving a selection of 3D objects provided by marketplace participants, and receiving a selection of 3D printing service providers from among a federated network of 3D printing service providers;

receiving a 3D printing request to print a 3D object selected from among the selection of 3D objects;

responsive to the 3D printing request and the 3D object selected from among the selection of 3D objects, listing at least some of the 3D printing service providers based on a 3D printer identifier metric, the 3D printer identifier metric includes a 3D printing quality metric, a 3D digital model type, and a digital rights authorization corresponding to a 3D printing request, wherein the digital rights authorization includes an indication that a respective 3D printing service provider of the listed 3D printing service providers is authorized to print the 3D object;

receiving a selection of a preferred 3D printing service provider from among the list of at least some of the 3D printing service providers.

* * * * *